United States Patent [19]

Roberts et al.

[11] Patent Number: 4,571,954
[45] Date of Patent: Feb. 25, 1986

[54] WAVEGUIDE PHASE CONJUGATE MIRROR

[75] Inventors: Thomas G. Roberts, Huntsville; Thomas E. Honeycutt, Somerville, both of Ala.

[73] Assignee: The United States of America as represented by the Secretary of the Army, Washington, D.C.

[21] Appl. No.: 677,949

[22] Filed: Dec. 4, 1984

[51] Int. Cl.$^4$ .............................................. F25B 19/00
[52] U.S. Cl. ................................ 62/514 R; 333/99 S; 350/354; 372/99
[58] Field of Search ............................. 62/125, 514 R; 333/99 S; 372/99; 350/354, 393

[56] References Cited

U.S. PATENT DOCUMENTS

| | | | |
|---|---|---|---|
| 3,258,602 | 6/1966 | Promish | 62/514 R |
| 3,339,151 | 8/1967 | Smith | 372/99 |
| 3,441,881 | 4/1969 | Weissman | 333/99 S |
| 3,464,223 | 9/1969 | Roberts et al. | 62/55.5 |
| 3,466,566 | 9/1969 | Patel | 372/99 |
| 3,568,762 | 3/1971 | Harbaugh | 62/514 R |
| 3,729,946 | 5/1973 | Massey | 62/514 R |
| 3,970,960 | 7/1976 | Moltenauer | 372/99 |
| 3,975,695 | 8/1976 | Hartman | 333/99 S |
| 4,012,699 | 3/1977 | Gibbs et al. | 350/354 |

OTHER PUBLICATIONS

D. T. Hon, "Applications of Wavefront Reversal by Stimulated Brillouin Scattering", Optical Engineering, vol. 21, No. 2, Mar./Apr. 1982, pp. 252-256.
R. W. Hellwarth, "Optical Beam Phase Conjugation by Stimulated Backscattering", Optical Engineering, Mar.-/Apr. 1982, vol. 21, No. 2, pp. 257-262.
C. R. Giuliano et al., "Can Phase Conjugate Resonators Enhance Laser Performance", Laser Focus, Feb., 1983, pp. 55-64.

Primary Examiner—Ronald C. Capossela
Attorney, Agent, or Firm—Anthony T. Lane; Robert P. Gibson; Freddie M. Bush

[57] ABSTRACT

A waveguide phase conjugate mirror for high power radiation at 10.6 μm. The phase conjugate mirror comprises an optical waveguide of liquid nitrogen clad by gaseous nitrogen. The waveguide is maintained in a porous tube which allows the gaseous nitrogen to escape through the walls. The tube is also used to maintain a temperature gradient across the radius of the liquid nitrogen waveguide. Pressure in the waveguide, is maintained by a pressure drop across the porous walls of the containing tube. In maintaining the pressure, one or more additional porous tubes may be used around the containing tube with an additional pressure drop across the wall of each tube until a final volume is reached where the pressure may be maintained constant by the use of a small exhaust pump. An optical system such as a window or a lens or both is supplied at the input end for coupling the 10.6 μm laser light into the waveguide mirror. This impinging light will subsequently be reflected back on itself with its phase conjugated by the mirror which the laser light itself produces.

14 Claims, 2 Drawing Figures

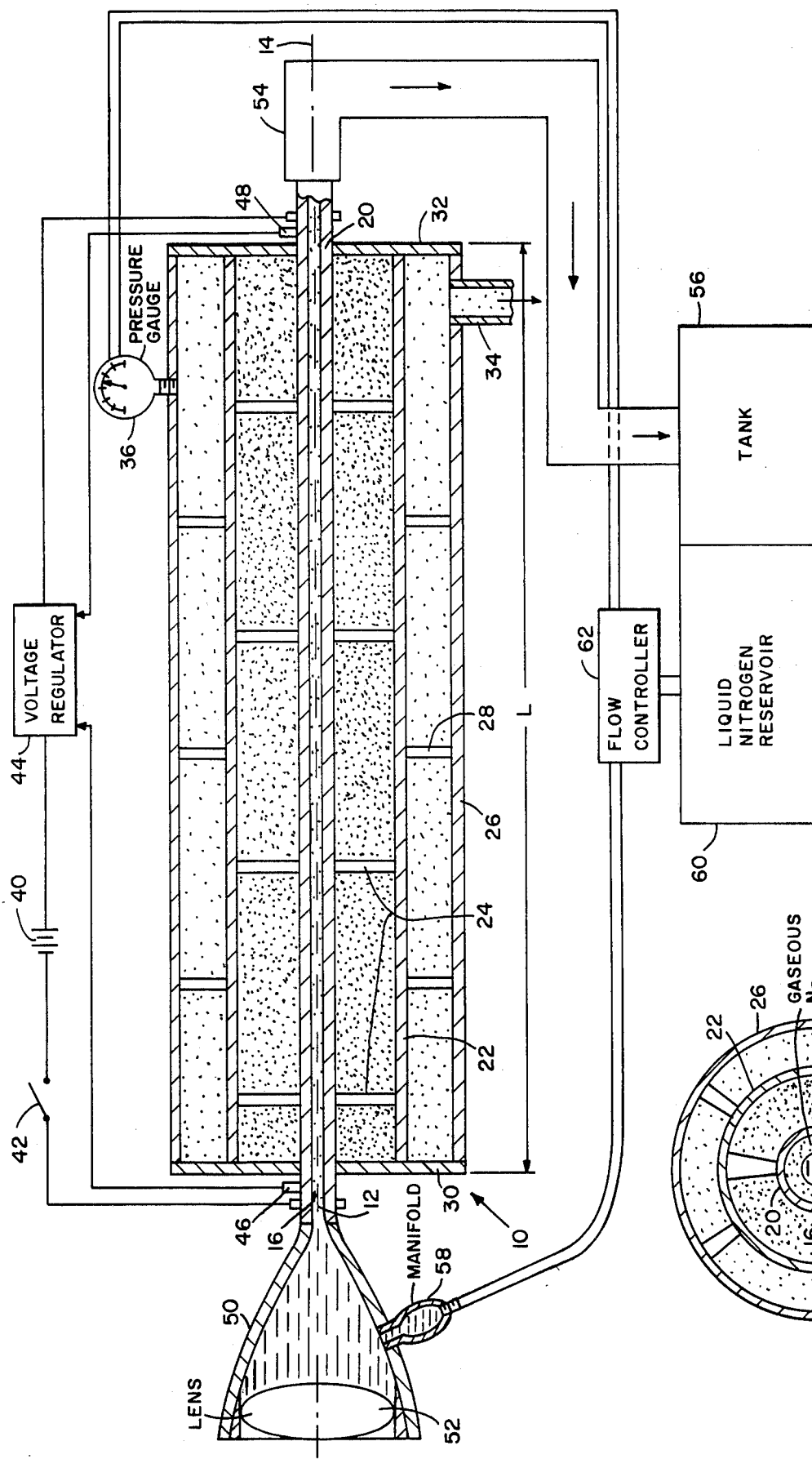
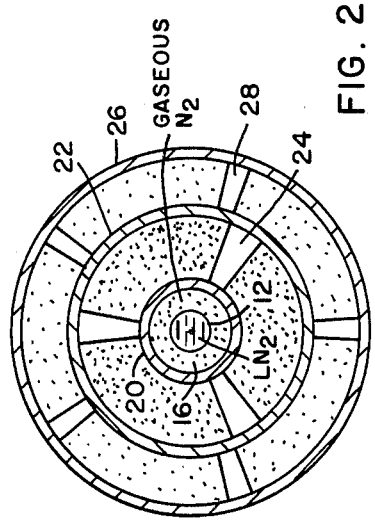
FIG. 1
FIG. 2

WAVEGUIDE PHASE CONJUGATE MIRROR

DEDICATORY CLAUSE

The invention described herein may be manufactured, used, and licensed by or for the Government for governmental purposes without the paymeht to us of any royalties thereon.

BACKGROUND OF THE INVENTION

When a strong monochromatic wave is incident on a transparent medium, it causes waves at lower frequencies to experience exponential gain if their frequency offset corresponds to the frequency of some excitation in the medium. Stimulated scattering of optical beams is such an excitation, whether it be of Raman, Brillouin, Rayleigh, or other origin, and the dominant backscattering has a very large phase conjugate component. Thus, these effects have been used as conjugate wave generators or phase-conjugate mirrors.

In conjugate wave generation, a new wave can be created when an incident wave impinges on a transparent medium. The new wave travels in a direction opposite to and with the opposite sign of transverse phase to the incident waves phase. Therefore, a diverging wave that is incident on a conjugator will leave as a converging wave that retraces the same path as the incident wave. Thus, a phase conjugator can be considered as a unique mirror that combines reflection with phase reversal.

Initial reports of optical phase conjugation have been published by workers in the Soviet Union in 1971 and 1972 but little or no interest was created in the subject until more recent years when potential applications for phase conjugation began to appear in the open literature. Of these applications most activity has centered on applications to adaptive optics where the effects of atmospheric turbulence on high-energy laser radiation may be corrected and where optical train distortions and pointing errors may be corrected; and on applications to optical resonators where defraction limited output beams may be produced, even though the active medium may be causing distortions. Some of the results of this activity and an explanation of phase conjugate mirrors are given in a review paper entitled "Optical Beam Phase Conjugation by Stimulated Backscattering" by R. W. Hellwarth, Optical Engineering, Vol. 21, No. 2, March/April 1982, pages 257-262; and in a paper entitled "Can Phase Conjugate Resonators Enhance Laser Performance" by C. R. Giuliano, et al., Laser Focus, Vol. 2, February 1983, pages 55-64. Phase conjugate mirrors are now in existence for radiation from some lasers, but do not exist for radiation from the high power 10.6 $\mu$m laser.

SUMMARY OF THE INVENTION

A waveguide phase conjugate mirror is provided for high power radiation at 10.6 $\mu$m. An optical waveguide of liquid nitrogen ($LN_2$) having a gaseous nitrogen ($GN_2$) cladding provides the phase conjugation. An optical lens system is disposed to couple input laser light into the waveguide mirror. This light is subsequently reflected back along the path of impingment with its phase conjugated by the mirror which the lasers light itself produces. The waveguide is maintained in a porous tube which allows the gaseous nitrogen to escape through the walls. The tube is also used to maintain a temperature gradient across the radius of the liquid nitrogen waveguide. Pressure in the waveguide is maintained by a pressure drop across the porous walls of the containing tube. One or more additional porous tubes are used around the containing tube with an additional pressure drop across the wall of each tube until a final volume is reached where the pressure is maintained constant and exhausted from the tube at near atmospheric pressure.

BRIEF DESCRIPTION OF THE DRAWINGS

FIG. 1 is a schematic drawing of a preferred embodiment of the 10.6 $\mu$m waveguide phase conjugate mirror with extraneous circuitry omitted.

FIG. 2 is a cross-sectional diagram of a typical waveguide and housing structure for the mirror of FIG. 1.

PREFERRED EMBODIMENT OF THE INVENTION

From the theory presented by Hellwarth, as noted hereinabove, it may be determined that the optimum way to produce a phase conjugate mirror would be to have a small diameter waveguide so that the power per unit cross sectioned area, P/S, injected into the guide would be large. However, the cross sectional area, S, must be large enough so that the number of modes in the guide is sufficient enough for the mirror to have the required resolution. Here the number of modes is proportional to $S/\lambda^2$ where $\lambda$ is the wavelength of the light being reflected by the mirror. Also the length of the guide must be long enough for the gain to build up in the desired mode. That is, $\gamma L$ is approximately 20 where L is the length of the guide and $\gamma$ is the gain eigenvalue for the phase conjugate mode.

Referring now to the drawings wherein like numbers refer to like parts, FIG. 1 is a preferred embodiment showing the best mode of the invention. A 10.6 $\mu$m waveguide phase conjugate mirror 10 is primarily comprised of an optical waveguide 12 of liquid nitrogen ($LN_2$) that is directed substantially along a longitudinal axis 14 for a distance L as noted hereinabove. A hollow, cylindrical, gaseous nitrogen ($GN_2$) column 16, having a lower index of refraction than the $LN_2$, encompasses the $LN_2$ column in essence forming a cladding therearound.

This $LN_2$ waveguide 12 and cladding 16 is contained in, and made stable along the axis by, a porous copper tube 20. The tube is originally at prevailing ambient or room temperature which allows the gaseous nitrogen to boil off or escape from the liquid nitrogen column to form the cladding therearound as the $LN_2$ passes through the length L. The porous copper tube allows the $GN_2$ to escape from tube 20 according to the porosity of the tube and the pressure applied to the incoming $LN_2$ column flowing through the tube.

The degree of stability of the system pressure and temperature may be further controlled by placing the copper tube 20 within one or more additional porous tubes. For this mode, as shown, the tube 20 is held in place, substantially centered inside another porous tube 22. Spacers 24 between the outer wall of tube 20 and the inner wall of tube 22 hold the tubes in spaced apart relationship and are partially open, i.e., spaced apart themselves, so that all chambers within the tube 22 are open to gas flow therebetween, providing uniform pressure around tube 20. Similarly, a tube 26 with spacers 28 may encompass tube 22. Tube 26 fuctions as an outer jacket and is used to contain the system. As such, jacket 26 does not have to be porous and, if desired, may be non-porous with selected output ports. Tubes 22 and 26 are sealed together and to tube 20 at respective common ends 30 and 32 thereof. Tube 26, if non-porous, has in it at least one and preferably several output ports 34 for removing the gaseous $N_2$, which thereby escapes the waveguide. A pressure gauge 36 is also mounted in the outermost tube wall (tube 26). An electrical circuit is used to maintain the walls of porous tube 20 at a constant temperature. This electrical circuit includes a power supply 40, a switch 42, and a voltage regulator 44 connected in series across copper tube 20. Regulator 44 is controlled by inputs from two temperature sensors 46 and 48 which are connected to tube 20. To one end of tube 20 is connected a flared copper or similar tube section 50 which contains an optical system 52 for coupling impinging 10.6 $\mu$m laser radiation into the waveguide 12. The optical system may simply be a transparent window for 10.6 $\mu$m wavelength and need not be of good optical quality since the phase conjugate effect compensates for flaws introduced by the optical elements. Similarly, optical system 52 may include or be a lens or lens system with or without an additional window. As discussed herein, system 52 is considered hereinafter as a lens but is not limited thereto. To the other end of tube 20 is connected a return line 54 for the liquid $N_2$. The system may be either open or closed. That is, the $LN_2$, after it passes through the tube 20, may be discarded or it may be collected as in tank 56 and reused in a closed system. To the flared section 50 of tube 20 is mounted a manifold 58 which may have one or more ports through which the $LN_2$ is admitted to the system. The $LN_2$ is coupled to manifold 58 from a reservoir 60 by way of a flow controller 62. The output pressure sensed by pressure gauge 36 is coupled to control or regulate the output of flow controller 62.

In preparation, $LN_2$ from flow controller 62 is turned on and the $LN_2$ is allowed to flow through the system until the system is cooled down and the $LN_2$ is being returned to the tank 56. Gaseous $N_2$, which is generated because of the temperature differential between $LN_2$ and the ambient surrounding temperature, expands and eventually is exhausted through porous tube walls or otherwise removed by a fan (not shown) if the walls are non-porous. The switch 42 is then closed, passing direct current through the porous tube 20 to establish a steady state temperature, thereby maintaining the walls of tube 20 at the temperature required to maintain a $LN_2$-$GN_2$ interface within tube 20. This sustains generation of gaseous nitrogen cladding around the $LN_2$. The two regulators 44 and 62 are then used to maintain the steady state temperature and pressure. In this steady state condition, the pressure in tube 20 is maintained constant and slightly higher than that in tube 22. The pressure in tube 22 is also constant and slightly higher than that in tube 26. The pressure in tube 26 is nearly constant and slightly higher than that at the exhaust ports 34 which are substantially at atmospheric pressure. The magnitudes of the pressure drops across the porous tubes are determined by the porosity of these tubes.

$LN_2$ is transparent to radiation at 10.6 $\mu$m providing the $LN_2$ is handled in a manner, when it is transferred for shipment and thereafter, such that water vapor from the atmosphere is not allowed to condense into the $LN_2$. Such water vaper condenses to become ice crystals which would scatter the 10.6 $\mu$m radiation in an undesired manner. Therefore, routine procedures are followed to assure use of dry $LN_2$, according to well known, established procedures. The system, as prepared, produces a $LN_2$ waveguide that is clad in gaseous $N_2$. This $LN_2$ waveguide will behave as a phase conjugate mirror when 10.6 $\mu$m radiation of sufficient power to produce this non-linear effect is incident on it.

There is no radial pressure gradient within tube 20, but there is a temperature gradient and, therefore, a density gradient and a gradient in the index of refraction which makes this section act as a waveguide. The inside diameter of tube 20 is of the order of 1 mm and there are no stringent conditions on waveguide uniformity. A typical tube length L is 1 meter for liquid nitrogen. However, the length L may be longer than this without detrimental effects, but should not be much shorter than a meter since it cannot be less than the interaction length. Imperfections in the waveguide actually aid phase conjugation by removing troublesome mode degeneracies. The method of constructing the porous copper tubes is routine. For example, the tubes may be constructed in a manner similar to that for porous copper or silver plates as described in Roberts, et al., U.S. Pat. No. 3,464,223. From this disclosure it is also apparent that the porous tubes may be constructed of metals other than copper, such as aluminum. The nature of the phase conjugated reflection is such that the optical quality of a window and/or lens need not be extremely good, and inexpensive components may be used.

Additionally, while a lens 52 is used to both seal the flared section 50 and couple radiation into the waveguide, an alternative is to use an input window that is transparent at the desired wavelength to seal the waveguide at the input end and to place a lens in front of the window to direct impinging radiation into the system. While a lens is not necessary for operation, the operation is enhanced by use of a lens.

During construction by etching of the porous portions of the tubes, the flared end and output end may be coated and protected (for example, by placing wax over the surfaces of the tube to be protected) so as to remain non-porous.

FIG. 2 is a typical cross-sectional view of the waveguide containment structure showing the $LN_2$ waveguide and gaseous $N_2$ therein. FIG. 2 shows the three tubes 20, 22, and 26 with support structure 24 and 28 for spacing the tubes apart.

In operation, the 10.6 $\mu$m waveguide phase conjugate mirror is used in a 10.6 $\mu$m laser system wherein the phase conjugate properties are desired. The radiation impinges on lens 52 and is directed into the $LN_2$ waveguide column 12. Light waves that find their way to the $GN_2$ cladding surface are reflected back into the $LN_2$ because of the reduced density and difference in index of refraction between $LN_2$ and $GN_2$. Diverging input radiation impinging on the system results in a converging wave being generated and reflected back on itself by the mirror. Similarly, a converging wave is reflected as a diverging wave.

Obviously many modifications and variations of the present invention are possible in the light of the above teachings. It is therefore to be understood that within the scope of the appended claims the invention may be practiced otherwise than as specifically described.

We claim:

1. A waveguide phase conjugate mirror for 10.6 $\mu$m laser light comprising: a cylindrical column of liquid nitrogen having respective first and second ends, said first end disposed for receiving impinging 10.6 $\mu$m radiation, and a gaseous nitrogen column cladding the liquid nitrogen around the circumference and along the length thereof for preventing light waves from exiting the liquid nitrogen around the circumference thereof.

2. A waveguide phase conjugate mirror as set forth in claim 1 and further comprising cylindrical housing means for sustaining the cylindrical shape of said liquid nitrogen column, lens means disposed adjacent to said first end of the column for directing impinging radiation into said first end.

3. A waveguide phase conjugate mirror as set forth in claim 2 and further comprising a chamber housing means having a first, enlarged, end and a second end; said cylindrical housing means having first and second end portions; said chamber housing means second end being joined to said first end of said cylindrical housing means and said first end of said chamber housing means supporting said lens means; said lens means sealing the first end of said chamber housing; and liquid nitrogen being disposed uniformly within said chamber means and communicating with said liquid nitrogen column first end for coupling laser light between said lens means and said liquid nitrogen column.

4. A waveguide phase conjugate mirror as set forth in claim 3 and further comprising pressurizing means coupled to said chamber means for applying pressure to said liquid nitrogen within the chamber and the column for maintaining said column, said liquid nitrogen housing means and lens being disposed in prevailing atmospheric conditions.

5. A waveguide phase conjugate mirror for 10.6 $\mu$m laser light comprising: a liquid nitrogen waveguide disposed uniformly, cylindrically, along a predetermined length, cladding circumferentially encompassing said liquid nitrogen along its predetermined length, said liquid nitrogen being disposed for receiving incident laser light at one end of said predetermined length and redirecting said light back along the same path of incidence as said light progresses along or penetrates the length of the waveguide.

6. A waveguide phase conjugate mirror as set forth in claim 5 and further comprising a lens means disposed adjacent the one end of the waveguide predetermined length for directing light incident thereon into said waveguide.

7. A waveguide phase conjugate mirror as set forth in claim 6 wherein said cladding is gaseous nitrogen.

8. A waveguide phase conjugate mirror for 10.6 $\mu$m laser light comprising: a first tube having a porous mid-portion and having a first end disposed for receiving flowing liquid nitrogen and a second end disposed for exhausting flowing liquid nitrogen, a tube member having a first end coupled to said first end of said porous first tube and having a second flared, end thereof; sealing means transparent to 10.6 $\mu$m laser light for sealing said flared end of said tube member to provide a chamber therein; a manifold coupled to said tube member for coupling liquid nitrogen into said chamber; flowing liquid nitrogen coupled to said tube member chamber for filling said chamber and for providing a stream of liquid nitrogen along said porous tube to said second end, said sealing means being disposed in optical alignment with said first ends of said porous tube and said tube member for coupling 10.6 $\mu$m light waves into said stream of liquid nitrogen for providing phase conjugation therein.

9. A waveguide phase conjugate mirror as set forth in claim 8 wherein said first porous tube is maintained at a temperature corresponding to the boiling point of liquid nitrogen for allowing gaseous nitrogen escaping from said liquid nitrogen to form between said tube and said liquid nitrogen, said gaseous nitrogen providing a cladding for said liquid nitrogen.

10. A waveguide phase conjugate mirror as set forth in claim 8 and further comprising heating means coupled to said first tube for maintaining said first tube at the boiling point of liquid nitrogen and thereby allowing gaseous nitrogen to be formed between the wall of said tube and said liquid nitrogen for cladding the liquid nitrogen.

11. A waveguide phase conjugate mirror as set forth in claim 10 and further comprising a second porous tube encompassing and spaced apart from the porous mid portion of said first tube and having the ends thereof sealed to the first tube for receiving gaseous nitrogen that passes through the walls of said first tube, said second tube allowing nitrogen to escape therefrom at a rate that maintains the tube at lesser pressure than the first tube.

12. A waveguide phase conjugate mirror as set forth in claim 11 wherein said sealing means is an optical element and further comprising fluid flow control means for directing said flowing liquid nitrogen into said chamber and for maintaining pressure of said flowing liquid nitrogen in the first tube.

13. A waveguide phase conjugate mirror as set forth in claim 12 wherein said optical element is a lens.

14. A waveguide phase conjugate mirror as set forth in claim 12 wherein said optical element is a window.

* * * * *